US006736313B1

(12) United States Patent
Dickson

(10) Patent No.: US 6,736,313 B1
(45) Date of Patent: May 18, 2004

(54) CARD READER MODULE WITH PIN DECRYPTION

(75) Inventor: Timothy E. Dickson, Greensboro, NC (US)

(73) Assignee: Gilbarco Inc., Greensboro, NC (US)

(*) Notice: Subject to any disclaimer, the term of this patent is extended or adjusted under 35 U.S.C. 154(b) by 0 days.

(21) Appl. No.: 09/567,689

(22) Filed: May 9, 2000

(51) Int. Cl.[7] .................................................. G06K 5/00

(52) U.S. Cl. ........................ 235/380; 235/381; 235/382; 235/383; 235/384; 705/16; 705/17; 705/18; 902/1; 902/2

(58) Field of Search ................................. 235/381, 380, 235/384, 383, 451, 492; 364/479.01; 700/241, 302; 705/13, 16, 17, 18; 902/2, 1, 4, 5

(56) References Cited

U.S. PATENT DOCUMENTS

| | | | | |
|---|---|---|---|---|
| 4,967,366 A | * | 10/1990 | Kaehler | ....................... 235/381 |
| 5,228,084 A | | 7/1993 | Johnson et al. | ................ 380/23 |
| 5,333,198 A | | 7/1994 | Houlberg et al. | .............. 380/49 |
| 5,375,169 A | | 12/1994 | Seheidt et al. | ................. 380/21 |
| 5,384,850 A | | 1/1995 | Johnson et al. | ................ 380/52 |
| 5,400,400 A | * | 3/1995 | Hird et al. | ................... 379/453 |
| 5,448,638 A | | 9/1995 | Johnson et al. | ................ 380/23 |
| 5,526,428 A | * | 6/1996 | Arnold | ........................ 713/159 |
| 5,594,233 A | | 1/1997 | Kenneth et al. | ............. 235/492 |
| 5,602,745 A | * | 2/1997 | Atchley et al. | ............ 235/94 R |

(List continued on next page.)

FOREIGN PATENT DOCUMENTS

EP         661675 A2  *  7/1995   ............. G07F/7/10

OTHER PUBLICATIONS

Schneier, *Applied Cryptography*, pp. 518–522, 1996.

*Primary Examiner*—Karl D. Frech
*Assistant Examiner*—Uyen Chau Le
(74) *Attorney, Agent, or Firm*—Withrow & Terranova PLLC

(57) ABSTRACT

A card reader module includes capabilities for receiving and decrypting an encrypted user PIN to facilitate off-line transaction authorization. In an off-line transaction, a transaction processing system need not communicate with an outside authorization network to obtain transaction authorization. Off-line transaction authorization is particularly relevant when a customer uses a secure payment device, such as a smart card. With a smart card, the transaction processing system, in cooperation with the smart card, compares a user-entered PIN, input through a keypad, with a user PIN stored on the smart card. If the input PIN matches the stored PIN, the transaction processing system authorizes the customer's transaction. Rather than including the keypad, the card reader module receives the PIN in encrypted format directly or indirectly from a separate keypad. To minimized fraud, the separate keypad encrypts the PIN before it is sent to the card reader module. The card reader module decrypts received PIN information for comparison to card-stored PIN information. Based on the comparison, the card reader module provides authorization information to other elements in the transaction processing system. Preferably, the card reader module is used in a fuel dispensing system. This allows off-line authorization of fueling transactions, based on verifying a user-entered PIN against a stored payment card PIN. By separating the PIN-entry keypad from the card reader module, the card reader module may be individually serviced, thereby reducing maintenance expenses, for the transaction processing system in which the card reader module is used.

32 Claims, 8 Drawing Sheets

U.S. PATENT DOCUMENTS

| | | | |
|---|---|---|---|
| 5,679,007 A | | 10/1997 | Potdevin et al. ............ 439/76.1 |
| 5,694,326 A | * | 12/1997 | Warn et al. ............ 364/479.01 |
| 5,712,912 A | | 1/1998 | Tomko et al. ................ 380/23 |
| 5,721,781 A | | 2/1998 | Deo et al. ..................... 380/25 |
| 5,724,423 A | | 3/1998 | Khello ........................ 380/23 |
| 5,790,410 A | | 8/1998 | Warn et al. ............ 364/479.02 |
| 5,797,470 A | * | 8/1998 | Bohnert et al. ............. 235/381 |
| 5,805,712 A | | 9/1998 | Davis .......................... 380/50 |
| 5,809,143 A | | 9/1998 | Hughes ....................... 380/24 |
| 5,815,577 A | | 9/1998 | Clark .......................... 380/52 |
| 5,859,779 A | * | 1/1999 | Giordano et al. ...... 364/479.01 |
| 5,862,222 A | * | 1/1999 | Gunnarsson ................ 380/24 |
| 5,920,730 A | | 7/1999 | Vincent ...................... 395/834 |
| 5,965,861 A | | 10/1999 | Addy et al. .................. 235/383 |
| 5,970,146 A | | 10/1999 | McCall et al. ................ 380/24 |
| 5,988,510 A | | 11/1999 | Tuttle et al. ................. 235/492 |
| 5,996,888 A | * | 12/1999 | Gromatzky ................... 232/15 |
| 6,024,286 A | | 2/2000 | Bradley et al. ............. 235/492 |
| 6,073,840 A | * | 6/2000 | Marion ....................... 235/381 |
| 6,092,629 A | * | 7/2000 | Bohnert et al. .............. 186/53 |
| 6,098,879 A | * | 8/2000 | Terranova ................... 235/384 |
| 6,138,239 A | * | 10/2000 | Veil .......................... 713/200 |
| 6,169,938 B1 | * | 1/2001 | Hartsell, Jr. ................ 700/302 |
| 6,176,421 B1 | * | 1/2001 | Royal, Jr. et al. ........... 700/241 |
| 6,185,307 B1 | * | 2/2001 | Johnson, Jr. ................ 380/270 |
| 6,257,486 B1 | * | 7/2001 | Teicher et al. .............. 235/380 |

\* cited by examiner

CARD READER MODULE WITH PIN DECRYPTION

FIELD OF THE INVENTION

The present invention relates to retail transaction authorization systems and, particularly, relates to card reader modules used in such systems.

BACKGROUND OF THE INVENTION

Retail transaction processing systems conventionally offer customer several different methods of payment. Payment options commonly include one or more types of payment cards. Such cards include magnetic-stripe credit and debit cards. To effect payment for a transaction, a customer causes the retail transaction processing system to read information from their payment card, such as by "swiping" the card in a magnetic card reader or placing the card in a bar-code scanner. An exemplary bar-code scanning system may be found in Applicant's U.S. Pat. No. 6,062,473, entitled "Bar Code Reader System" and incorporated herein by reference. In turn, the retail transaction processing system contacts an outside authorization network, submits the payment information obtained from the card, and allows or disallows the customer transaction based on return authorization information.

Frequently, a customer must enter a personal identification number referred to as a "PIN" and the retail transaction processing system transmits this PIN to the outside authorization network for verification. As the primary value of PIN use is fraud prevention, providing secure PIN handling within the retail transaction processing system is critical. U.S. Pat. Nos. 5,228,084, 5,384,850, and 5,448,638, all issued to Johnson, et al., and having the same Assignee as the Applicant's present invention, detail secure PIN handling apparatus and encryption techniques in the context of a fuel dispensing system and the disclosures of these named patents are incorporated herein by reference.

In general, the aforementioned patents relate to a fuel dispensing system providing secure PIN entry at a fuel dispenser, the PIN being entered into a keypad in or proximate to the fuel dispenser. The keypad includes electronics for encrypting the PIN information using a local key. Encrypted PIN information is then passed to a site controller, which may manage the operations of one or more fuel dispensers. The site controller cooperates with a security module, with the security module providing PIN decryption capabilities to decrypt the PIN received from the fuel dispenser using a local key. After decryption, the security module re-encrypts the PIN, this time using a network key. Re-encrypted PIN information is then transferred from the site controller to an outside authorization network for PIN verification. This technique allows the network encryption key information to remain within the essentially tamperproof secure security module rather than it residing in the less secure electronic environment of the fuel dispenser.

Newer types of payment cards, such as electronic smart cards, have the capability to securely store verification information within the card itself. Thus, a retail transaction processing system capable of interfacing with a smart card may obtain transaction authorization based on information contained in the smart card itself. This allows so-called off-line transaction processing. In an off-line transaction, the retail transaction processing system need not communicate with an outside authorization network in real time. Rather, verification and authorization activities occur locally between the retail transaction processing system and the customer's smart card, with the retail transaction system reconciling transaction charges with the outside authorization network at a later time. Localized transaction authorization still requires positive identification of the customer and, as such, the customer is commonly required to enter a PIN in conjunction with use of their smart card. After inputting by the customer, this PIN information is transferred to the smart card, where its internal processing capabilities allow for comparison of the input PIN with stored PIN information contained in the smart card's memory.

Previous designs require transfer of input PIN information to the smart card interface in an unencrypted format—known as an "in the clear" transfer. Because of the sensitive nature of PIN information, such designs use PIN entry devices that are generally designed in a manner that prevents physical tampering with the device for the purpose of illicitly gaining access to unencrypted PIN information input by customers. Since the input PIN information must be securely conveyed to the smart card interface so that it can be communicated to the smart card itself, past smart card interfaces integrated the PIN entry device into a common, physically secure housing. In so doing, the potential for fraud is reduced by eliminating any physically accessible wiring or communications link between the PIN entry device and the smart card interface. However, such integration is not without drawbacks.

Integrating a PIN entry device, such as a keypad, into the smart card reader complicates the overall physical design of the card reader. These design challenges are exacerbated by the fact that overall construction of the smart card reader must be substantially tamper-resistant. Tamper-resistant construction of the card reader/keypad modules significantly complicates field servicing. This is particularly unfortunate, as any system subjected to daily and sometimes careless use by consumers, will fail eventually. Integrating a keypad with a smart card reader has the further drawback of limiting placement options for the keypad/card reader combination within retail transaction processing systems.

Thus, separating the card reader module from the PIN entry device offers several distinct advantages. The PIN entry device, which may be more prone to failure than the card reader module, may be made a separate, independently replaceable component in the transaction processing system. However, entering a PIN into a physically separate device introduces an opportunity for fraud because the customer PIN information must be conveyed between different devices, which may be physically separated by several meters or more.

To eliminate this opportunity for fraud, PIN information is encrypted at its point of entry, e.g., in the input keypad. The card reader module of the present invention includes an interface adapted to receive this encrypted PIN information, along with processing capabilities necessary to decrypt such information. Thus, the present invention allows physical separation of the card reader module from the PIN entry device without compromising overall PIN handling security.

SUMMARY OF THE INVENTION

A card reader module for inclusion within a retail transaction processing system provides off-line transaction authorization capability based on processing encrypted PIN information. The card reader module includes a communications interface for receiving encrypted PIN information from another sub-system within the retail transaction processing system and a card interface for communicating with a customer payment card having stored PIN verification information and processing capabilities, such as an electronic smart card. A customer desiring to pay for a transaction using this type of payment card inputs their PIN into an encrypting device for secure transfer to the card reader module. In a preferred embodiment, the card reader module decrypts the received PIN information and provides the decrypted information to the customer payment card, thereby allowing it to determine the validity of the entered PIN information. Based on information returned from the customer payment card, the card reader module provides authorization information to other elements in the retail transaction processing system.

By including PIN decryption processing within the card reader module of the present invention, it may be separated from other elements in the retail transaction processing system without compromising PIN security. For example, an encrypting keypad may be used to receive customer-input PIN information. Once encrypted by the keypad, this secure PIN information may be transferred to the card read module without requiring special security precautions regarding the communications link, e.g., wiring, between the keypad and the card reader modulo. Conventionally, PIN entry devices are physically integrated into card reader modules in a tamper-proof manner. This integration complicates placement of the integrated module within a customer interface included in the retail transaction processing system and increases service complexity and cost because a failure of either the PIN-entry device or card reader requires replacement of the entire tamper-proof assembly. Providing a separate card reader module with PIN decryption capabilities solves these aforementioned problems and preserves PIN security.

A preferred embodiment of the present invention includes a fuel dispenser associated with a card reader module of the present invention. An encrypting keypad, also associated with the fuel dispenser, permits customers to input PIN information that is securely transferred to the card reader module. Based on providing a customer payment card with the decrypted PIN information, the card reader module obtains authorization for a fueling transaction from the customer payment card without requiring a communications link to an outside authorization network.

DETAILED DESCRIPTION OF THE INVENTION

Figure 1:
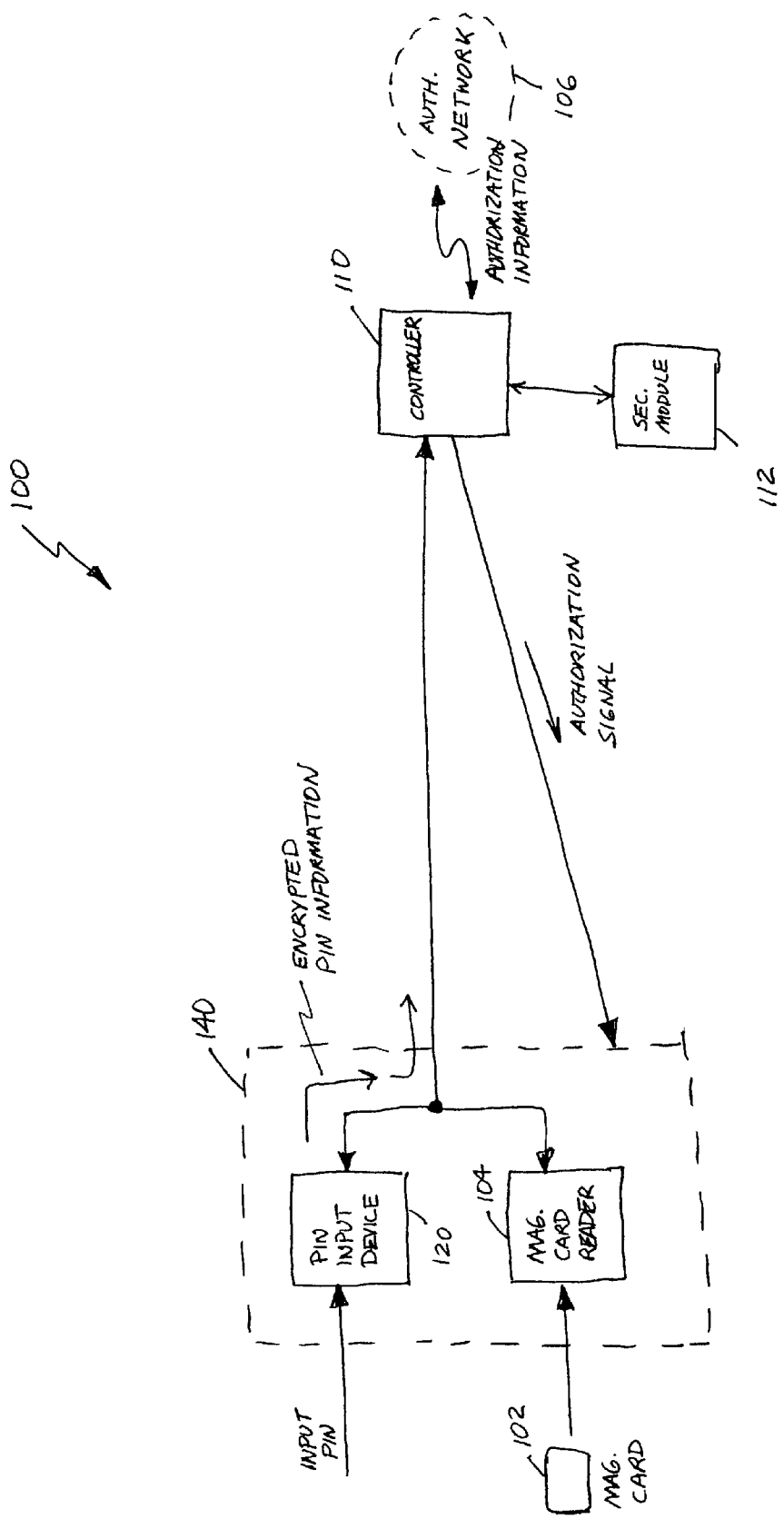
FIG. 1 is a simplified block diagram of a prior-art fuel dispensing system.

FIG. 1 illustrates a prior art fuel dispensing system 100. A fuel dispenser 140 includes a PIN input device 120 and an associated magnetic card reader 104. Existing fuel dispensing systems include PIN input devices with encryption capability. Encrypted PIN information is useful in verifying credit and debit card transactions based on securely transferring the PIN between various sub-systems comprising the fuel dispensing system. However, existing systems do not incorporate smart card interfaces that are economically or conveniently integrated into such existing systems.

Customers use their magnetic-stripe payment cards 102, such as debit or credit cards, to pay for dispensed fuel. To do so, customers swipe their magnetic payment card 102 through the magnetic card reader 104 and, typically, enter their associated PIN information into the PIN input device 120 for particular types of transactions, such as debit card transactions. Because the communications link between the PIN input device 120 and the controller 110 is conventionally not protected against physical tampering or data intercept, the PIN input device 120 encrypts the customer-input PIN information using a local key before it is transmitted to the controller 110. The controller 110 receives the encrypted PIN information and transfers it to a security module 112. The security module 112 decrypts the PIN using local key information. Then, using a different, network key, the security module 112 re-encrypts the PIN for transfer back to the controller 110 for subsequent transfer to an outside authorization network 106, as explained earlier. Authorization information returned by the authorization network 106 determines whether the controller 110 provides a fuel dispenser 140 with an authorization signal that allows the customer to conduct the fueling transaction.

Intelligent payment cards, such as electronic smart cards, can eliminate the need for contacting the outside authorization network 106 for the purposes of obtaining transaction authorization. Such payment cards can provide local PIN verification and subsequent transaction authorization. The term smart card generally connotes an electronic payment card having internal logic processing capability and memory storage. Such capabilities allow the smart card to store and manage detailed payment account information and to perform certain transaction authorization functions. As compared to conventional magnetic-stripe cards (e.g., credit cards), smart cards support substantially more detailed interaction with a given retail transaction system adapted to interface with them. U.S. Pat. No. 5,594,233 to Kenneth provides information regarding various smart card standards, smart card capabilities, and exemplary smart card interface apparatus, the disclosure of which is incorporated herein by reference. U.S. Pat. No. 6,024,286 to Bradley, et al. details various smart card implementations, as well as illustrating the prior art practice of integrating PIN-entry keypads into the card reader device, the disclosure of which is incorporated herein by reference.

Thus, the inclusion of smart card interface systems within retail transaction systems provides such systems with distinct advantages. Because of the desire to minimize fraud, smart card-based transactions still typically require the card user to enter a PIN or other private identifying information in conjunction with using the smart card for transaction payment. Thus, as noted, key entry devices are commonly integrated into prior art smart card interface devices.

Figure 2:
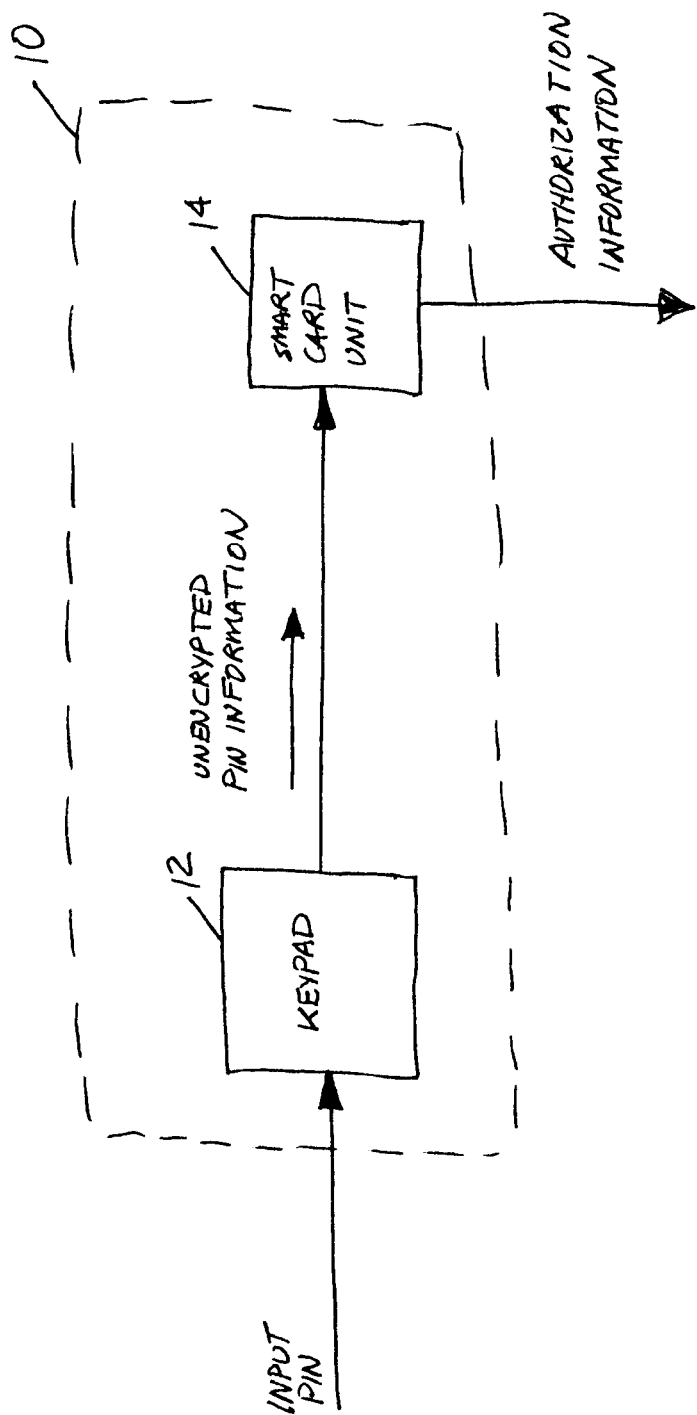
FIG. 2 is simplified block diagram of a prior-art smart card reader with integrated keypad.

FIG. 2 illustrates a typical prior art combination of a smart card interface device 10 that includes a keypad 12 for PIN input and a smart card unit 14 for smart card interfacing and associated processing in a typical retail transaction device. Conventionally, a physically secure module enclosure houses the smart card interface device 10. As the keypad 12 and smart card unit 14 are integrated into the same tamper-resistant housing, PIN information input into the keypad 12 is not encrypted before transferring it to the smart card unit 14. This is permissible because the communications link is itself protected from fraudulent intercept by virtue of the tamper-resistant housing. However, such integration between keypad 12 and smart card unit 14 has attendant disadvantages, particularly with regard to servicing and replacement of either the keypad 12 or smart card unit 14.

Figure 3:
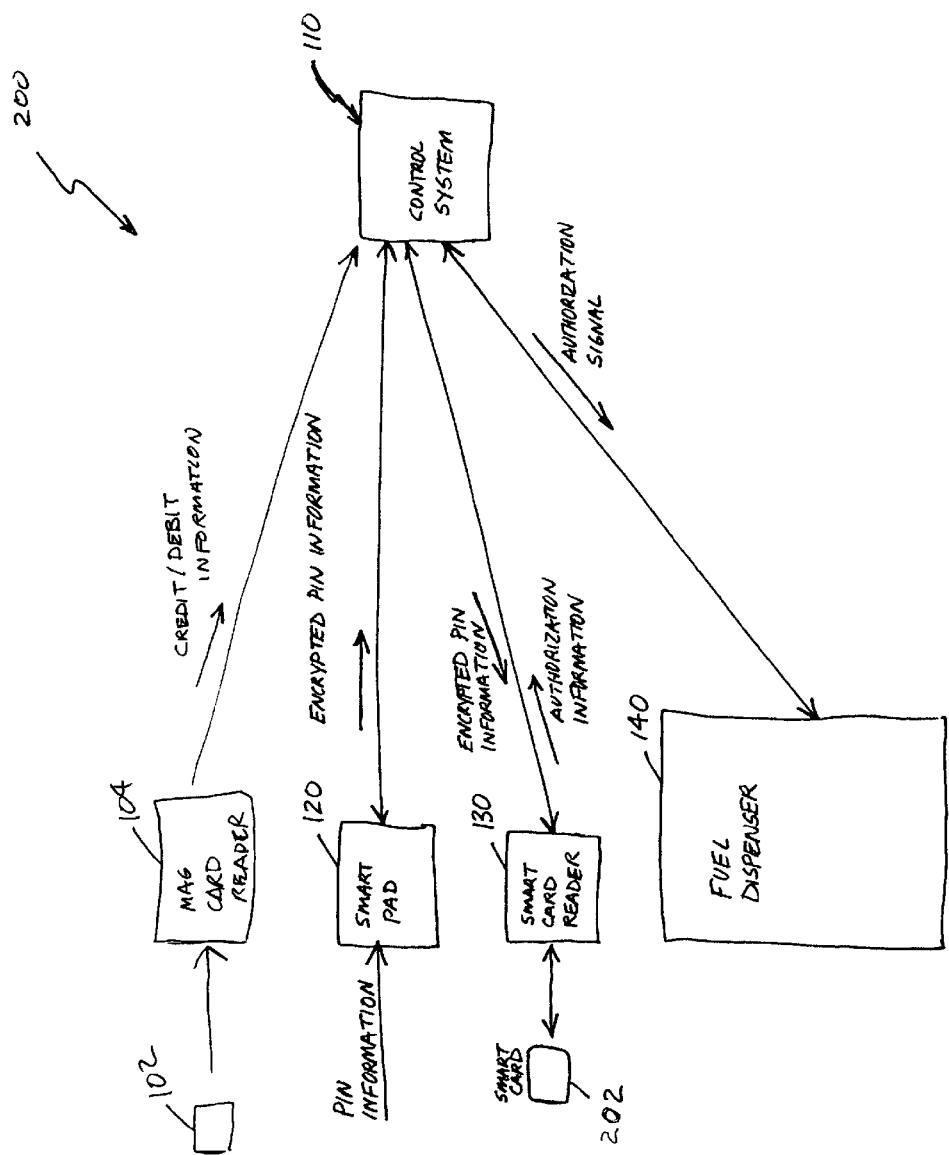
FIG. 3 is a simplified block diagram of a fuel dispensing system in accordance with a preferred embodiment of the present invention.

FIG. 3 illustrates an exemplary fuel dispensing system 200 that incorporates the card reader module 130 of the present invention. System 200 includes a control system (or site controller) 110, a security module 112, and a fuel dispenser 140. Fuel dispenser 140 includes the card reader module 130 in accordance with the present invention, an encrypting keypad 120 referred to herein by Applicant as a "SMART PAD," a magnetic card reader 104, dispensing hardware and electronics 142, and an interface controller 144. Note that the exemplary embodiment illustrated by FIG. 3 depicts at least the SMART PAD 120 and card reader module 130 integrated within fuel dispenser 140. This configuration simply represents an exemplary option, the card reader module 130 and/or SMART PAD 120 may be located apart from the fuel dispenser while still being associated with its operation. Moreover, a single SMART PAD 120 and card reader module 130 may be associated with more than one fuel dispenser 140, with such details largely a matter of design or installation necessity.

A customer conducts fueling transactions using fuel dispenser 140. Payment for fuel may be made through magnetic card reader 104 or smart card reader 130, or through alternate payment acceptors, such as wireless communication interfaces (not shown). Transactions based on a customer using a conventional credit/debit card via magnetic card reader 104 result in credit card information being passed from magnetic card reader 104 to control system 110 via interface controller 144. Validating PIN information, input by the customer via SMART PAD 120, also passes through interface controller 144 to control system 110. However, the pin information transfers to control system 110 in an encrypted format to protect sensitive PIN data. Security module 112 decrypts the PIN information and re-encrypts it for transfer to the authorization network (along with other credit card information) via control system 110. If the authorization network returns authorization approval to the control system 110, it provides an authorization or dispenser enable signal to dispensing hardware and associated electronics 142 in fuel dispenser 140, thereby allowing the customer to complete their fueling transaction.

Use of the card reader module 130 in accordance with the present invention permits off-line authorization of transaction payment. When a customer uses their smart card 202 (or other type of intelligent payment card), payment authorization may be obtained locally based on information stored within the smart card 202. Smart card 202 is placed in communications with card reader 130, and SMART PAD 120 provides card reader module 130 with encrypted PIN information based on customer-input PIN data. FIG. 3 illustrates such information passing to card reader module 130 via interface controller 144, but alternate embodiments provide for direct transfer of encrypted PIN information between SMART PAD 120 and card reader module 130, or indirect transfer through control system 110 in conjunction with interface controller 144.

Enhancing the practicality of the present invention, neither SMART PAD 120 nor card reader module 130 need be initially configured with encryption keys. This minimizes security concerns associated with, for example, warehousing a supply of SMART PADS 120 and/or card reader modules 130. Absent access control and other potentially expensive security precautions, such stored encryption keys might be compromised by determined would-be criminals. This also eliminates the need to pair specific card reader modules 130 and SMART PADs 120 based on matching encryption keys. The present invention accomplishes this by utilizing functionality security module 112 in determining and loading local encryption keys into SMART PAD 120 and card reader module 130, after installation into fuel dispensing system 200. Specifically, the present invention contemplates the use of a security module using an Encryption Key Exchange (EKE) algorithm to establish the encryption keying relationship between the SMART PAD 120 and card reader module 130. In this context, security module 112 is consistent with that described in the previously incorporated U.S. Pat. Nos. 5,228,084, 5,384,850, and 5,448,638. Understanding how security module 112 provides this functionality requires some understanding of cryptography, and a more detailed understanding of the EKE, and its variants. Bruce Schneier provides a comprehensive introduction to cryptography in his book, "*Applied Cryptograpy*", Second Edition, published in 1996 by John Wiley & Sons, Inc., the entirety of which is incorporated herein by reference. In particular, see pages 518–522 of this book for a specific presentation of the EKE and its uses. EKE provides secure authentication in a computer network environment. Using EKE, two computer systems use a shared secret key to encrypt a randomly generated public key. EKE provides a method for securely establishing a keying relationship between two devices or entities that do not share any secret data. Both the SMART PAD 120 and card reader module 130 may be thought of as "networked entities," albeit indirectly, with security module 112. Through communication of non-secret data between the two networked entities, a shared key may be established. This shared key may then be used to generate a common (and private) session key that is used by both systems to encrypt information exchanged during the session. In an exemplary embodiment, encryption key distribution between security module 112, SMART PAD 120, and card reader module 130 are based on the well known Diffie-Hellman protocol, which offers, among other advantages, a simplification of the EKE algorithm.

Thus, in the context of the present invention, the use of EKE allows the security module 112 to determine, in cooperation with SMART PAD 120 and card reader module 130, encryption key information used to encrypt and decrypt customer-input PIN information. Because this is done after a particular SMART PAD 120 and card reader module 130 are place in communications with a particular security module 112, the need to inject secret encryption keys into either the SMART PAD 120 or card reader module 130 is eliminated.

SMART PAD 120 is preferably housed in a tamper-resistant enclosure suitable for mounting within the fuel dispenser 140, or other retail transaction system. By design, the SMART PAD 120 prevents access to internal keypad wiring that carries input unencrypted PIN information. As explained above, SMART PAD 120 encrypts the input PIN information using a local encryption key. Once encrypted, the SMART PAD transfers the PIN information to various other sub-systems within the fuel dispensing system 200.

The card reader module 130 of the present invention reads intelligent payment cards, such as electronic smart cards 202. With the card reader module 130 providing an interface to the customer's smart card 202, the control system 110 can conveniently enable the fuel dispenser 140 based on authorization information determined locally in cooperation with the smart card 202. In this scenario, the control system 110 need not contact an outside authorization network 106 for PIN verification purposes. The customer physically interfaces their smart card 202 with the card reader module 130 and then enters their PIN or other identity verification data into the SMART PAD 120. Once encrypted within the SMART PAD 120, this PIN information is transferred to the control system 110, which relays it to the card reader module 130. The card reader module 130 decrypts the encrypted PIN information, with the decrypted PIN information processed in cooperation with the customer smart card 202 to determine whether the transaction is authorized. Transaction authorization is based, in part, on verifying the customer-input PIN information against information stored on the customer smart card 202. Depending upon the smart card 202 implementation, this verification consists of the card reader module 130 decrypting the customer-input PIN information encrypted by the SMART PAD 120 and transferring this decrypted PIN information to the smart card 202 for on-card verification, or consists of the card reader module 130 receiving stored verification information from the smart card 202 in response to a request for such data and performing the customer-input PIN verification itself.

As noted, before the customer-input PIN can be verified, card reader module 130 must decrypt the PIN information it receives directly or indirectly from SMART PAD 120. If the customer has entered valid PIN information and if the smart card 202 contains available payment credit, the control system 110 provides the fuel dispenser 140 with an authorization signal, thereby allowing the customer to proceed with the fueling transaction.

Although FIG. 3 depicts the SMART PAD 120 and the card reader module 130 apart from the fuel dispenser 140, both may be physically integrated into the housing of the fuel dispenser 140. Preferably, the SMART PAD 120 and card reader module 130 are each contained in a tamper-resistant module housing. All, or at least a critical portion of the electronics comprising the functional portions of the card reader module 130 (and SMART PAD 120) are preferably disabled in response to any attempted tampering. Such disabling may be mechanical, such as bonding critical circuit traces to interior elements of the housing in a manner that breaks them upon opening the enclosure. As an alternative, or in combination with this, certain data codes that must be present for operation may be stored in a memory that is erased or corrupted upon opening the housing. Of course, many other suitable methods exist for preventing access to the interior of the card reader module 130 and SMART PAD 120.

FIG. 3 additionally illustrates an economic advantage of the card reader module 130 of the present invention. Particularly, FIG. 3 illustrates the use of a magnetic card reader 104 for use with a conventional credit/debit card 102 in combination with the card reader module 130 of the present invention. As earlier detailed, the SMART PAD 120 provides encrypted verification indicia to the control system 110 (or other sub-systems within the fuel dispensing system 200) in conjunction with credit/debit card transactions conducted using the magnetic card reader 104. Encrypted information from SMART PAD 120 is also used for transactions conducted using card reader module 130. Thus, an exemplary embodiment of the present invention uses a single keypad (SMART PAD 120) for transactions involving either the magnetic card reader 104 or the card reader module 130 of the present invention.

Figure 4:
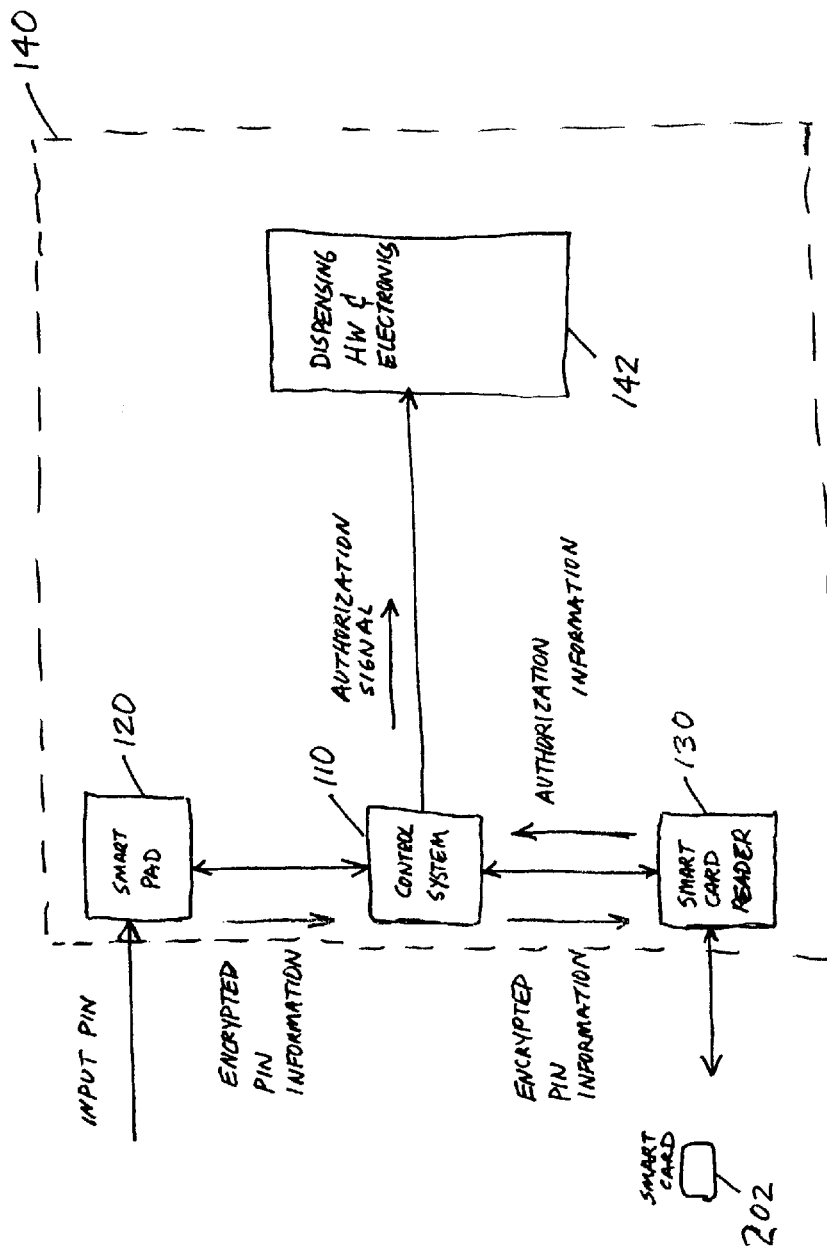
FIG. 4 is a simplified block diagram of a fuel dispenser in accordance with an exemplary embodiment of the present invention.

FIG. 4 illustrates another exemplary embodiment of the present invention. In FIG. 4, the fuel dispenser 140 integrates the control system 110, the SMART PAD 120, the card reader module 130, and the dispensing hardware and associated electronics 142. In this embodiment, the fuel dispenser 140 is capable of stand-alone, off-line transaction authorization based on interfacing with a customer smart card 202 via card reader module 130. Note that the configuration of FIG. 4 may use the security module 112 illustrated in FIG. 3 in a similar manner. In this case, encryption key information is handled between SMART PAD 120 and card reader module 130 in cooperation with security module 112 as previously explained.

Figure 5:
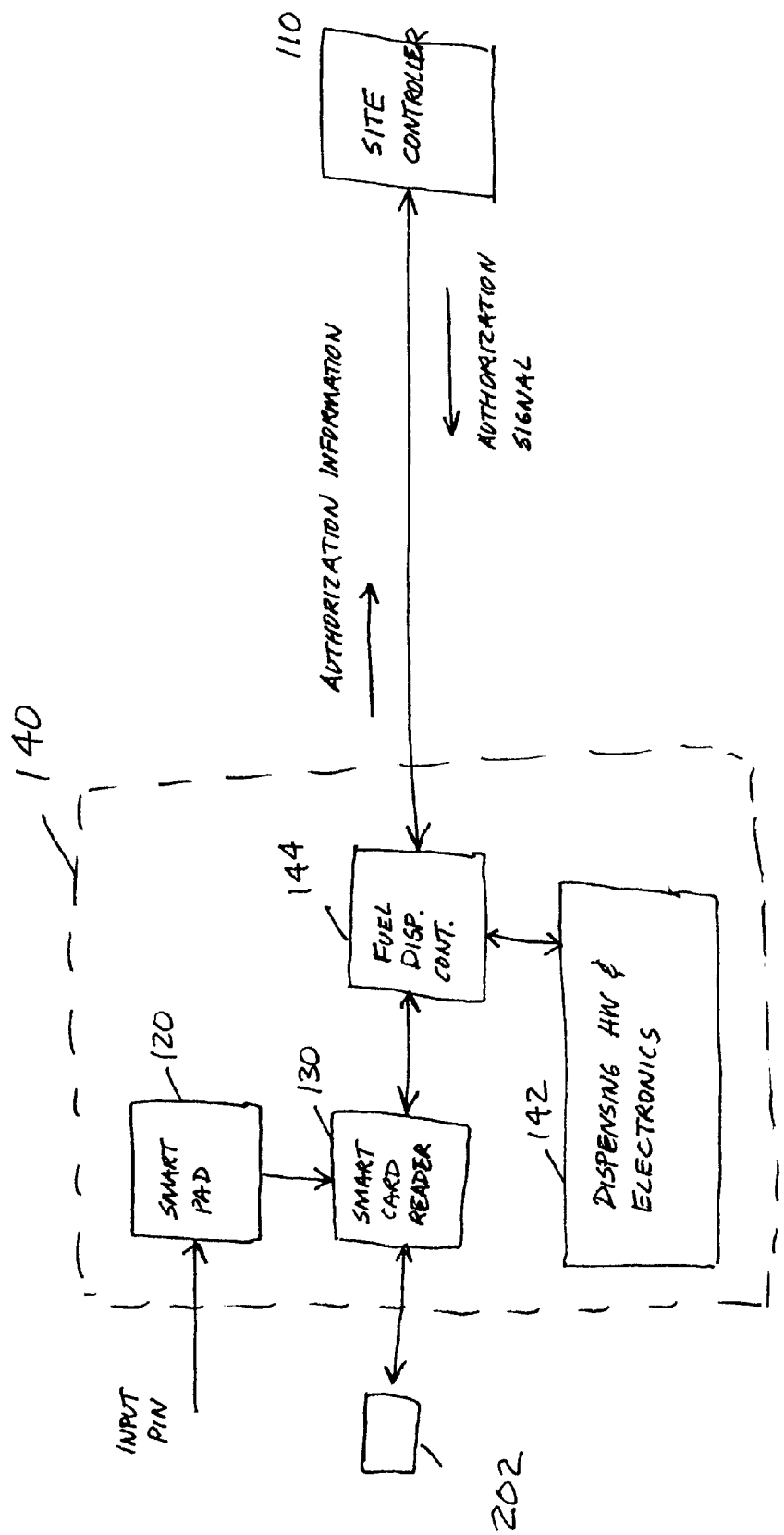
FIG. 5 is a simplified block diagram of a fuel dispensing system in accordance with an exemplary embodiment of the present invention.

FIG. 5 illustrates another exemplary embodiment of the present invention. In FIG. 5, the fuel dispenser 140 again integrates the SMART PAD 120, the card reader module 130, the dispensing hardware and associated electronics 142, along with a fuel dispenser controller 144. Note that the fuel dispenser controller 144 may be associated with other payment interfaces (not shown), such as a magnetic card reader or wireless payment interface, and may also be associated with the fuel dispenser's customer interface (not shown). In this embodiment, the SMART PAD 120 directly transfers encrypted PIN information to the card reader module 130 for verification processing. The fuel dispenser controller 144 receives information from the card reader module 130 indicating whether the given transaction is authorized. This information is transferred to the control system 110, which, if the transaction is authorized, provides an authorization signal used by fuel dispenser controller 144 to enable the dispensing hardware and associated electronics 142. As with FIGS. 3 and 4, the exemplary configuration of FIG. 5 may use a security module 112 in association with encryption/decryption key operations.

The above illustrations depict various physical configurations of fuel dispensing systems including the card reader module 130 of the present invention. The location of the card reader module 130, whether in the fuel dispenser 140, or remotely located, is not critical to practicing the present invention. Nor is it critical as to whether the card reader module 130 receives encrypted PIN information directly from the SMART PAD 120, or indirectly from another electronics subsystem, such as the control system 110. Further, the specific architecture of the fuel dispenser 140, including its interconnection with control system 110, is not critical to practicing the present invention. The card reader module 130 of the present invention includes the ability to decrypt encrypted PIN information received from an external system. This allows the communications link or wiring between the external system and the card reader module 130 to be unprotected, thereby significantly reducing the expense associated with installing, maintaining, or modifying the communications link.

Figure 6:
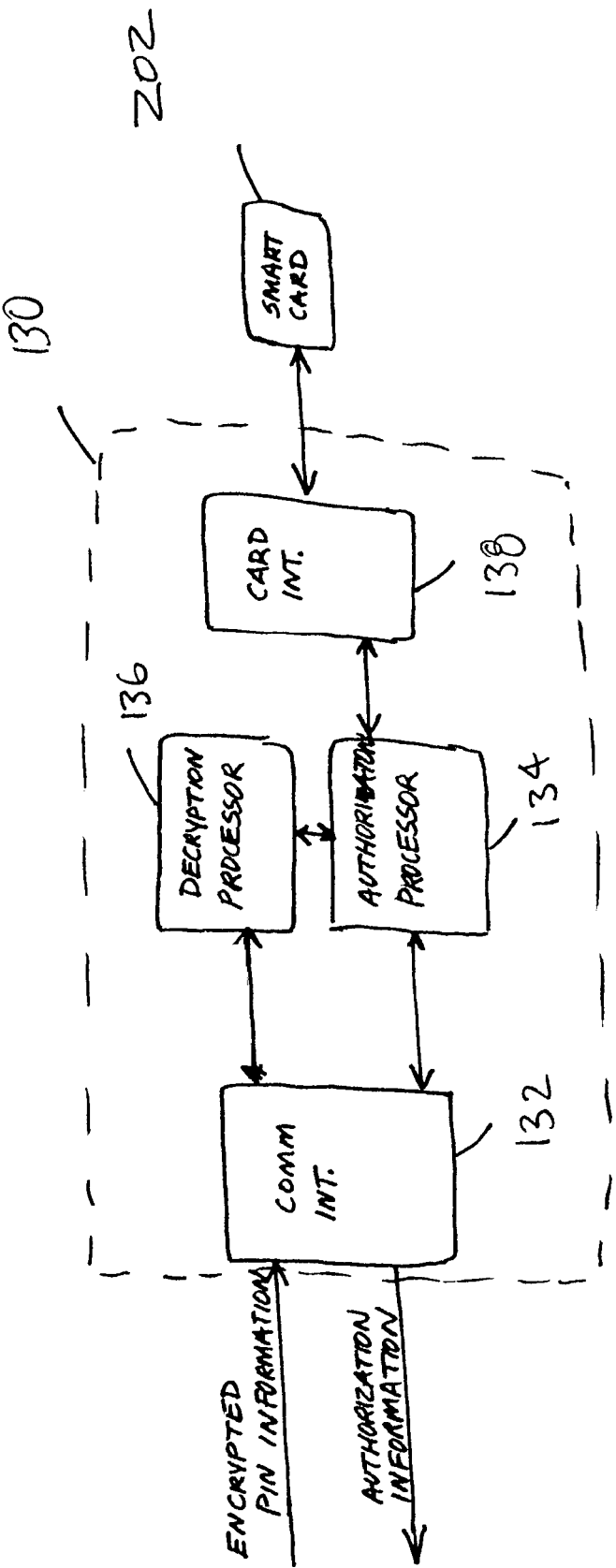
FIG. 6 is a simplified block diagram of a preferred embodiment for the card reader module 130 of the present invention.

FIG. 6 provides more detail regarding the card reader module 130 in a preferred embodiment of the present invention. A communications interface 132 provides a connection between the card reader module 130 and the device from which it receives the encrypted PIN information. As noted, the card reader module 130 preferably receives this information directly from SMART PAD 120, or from an associated control system 110. The card reader module 130 also provides an authorization information output via communications interface 132, for providing authorization information to an associated system, such as the control system 110 or the fuel dispenser controller 144. Although FIG. 6 depicts different signal lines for the incoming encrypted PIN information and outgoing authorization information, the card reader module 130 may actually have a single interface for both incoming and outgoing information.

Internally, a decryption processor 136 receives the encrypted PIN information through the communications interface 132. The decryption processor 136 decrypts this information and provides the decrypted PIN and associated data to the authorization processor 134. The authorization processor 134 communicates with the customer smart card 202 through the card interface 138.

In a preferred embodiment, the authorization processor 134 provides the smart card 202 with the decrypted PIN information and relies on the smart card 202 to determine transaction authorization based on the decrypted PIN information. Thus, the smart card's processing capability is advantageously used for the purpose of determining off-line transaction authorization. Based on comparing the decrypted PIN information it receives from the authorization processor 134 with its own internally stored PIN data, the smart card 202 determines whether or not authorize the fueling transaction. The smart card 202 provides authorization processor 134 with this authorization information and, in turn, authorization processor 134 outputs the authorization information via communications interface 132. In other exemplary embodiments, the smart card 202 provides the authorization processor 134 with its stored PIN information and the authorization processor 134 compares the stored PIN information received from the smart card 202 with the decrypted PIN information received from the decryption processor 136. Based on this comparison, the authorization processor 134 provides output authorization information via communications interface 132.

Figure 7:
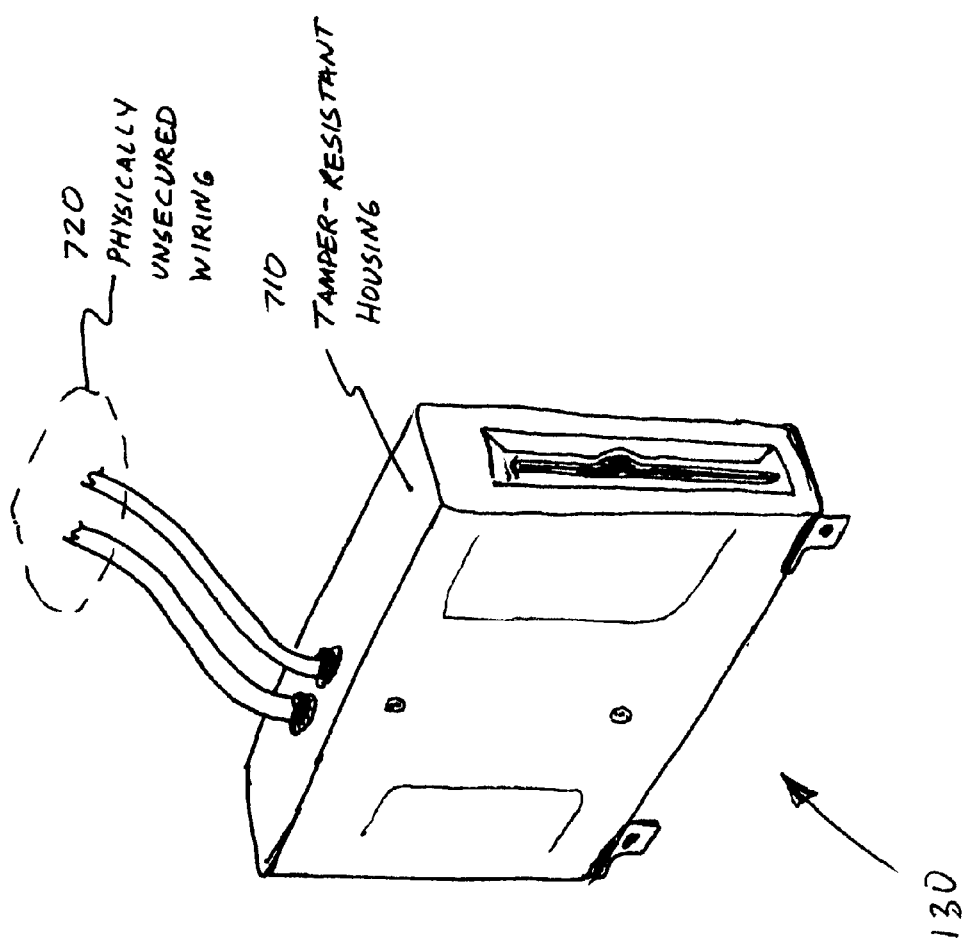
FIG. 7 is an isometric view for an exemplary physical embodiment of the card reader module of the present invention.

FIG. 7 depicts an exemplary physical embodiment of the card reader module 130 of the present invention. The card reader module 130 electronics and wiring terminations are physically secured within a tamper-resistant housing 710. Interface wires 720 exit the tamper-resistant housing 710 and connect with associated subsystems, such as the SMART PAD 120 or the control system 110. Because these interconnect lines 720 do not carry any sensitive customer identification information in an un-encrypted format, they are not protected between the card reader module 130 and any associated, external devices.

Figure 8:
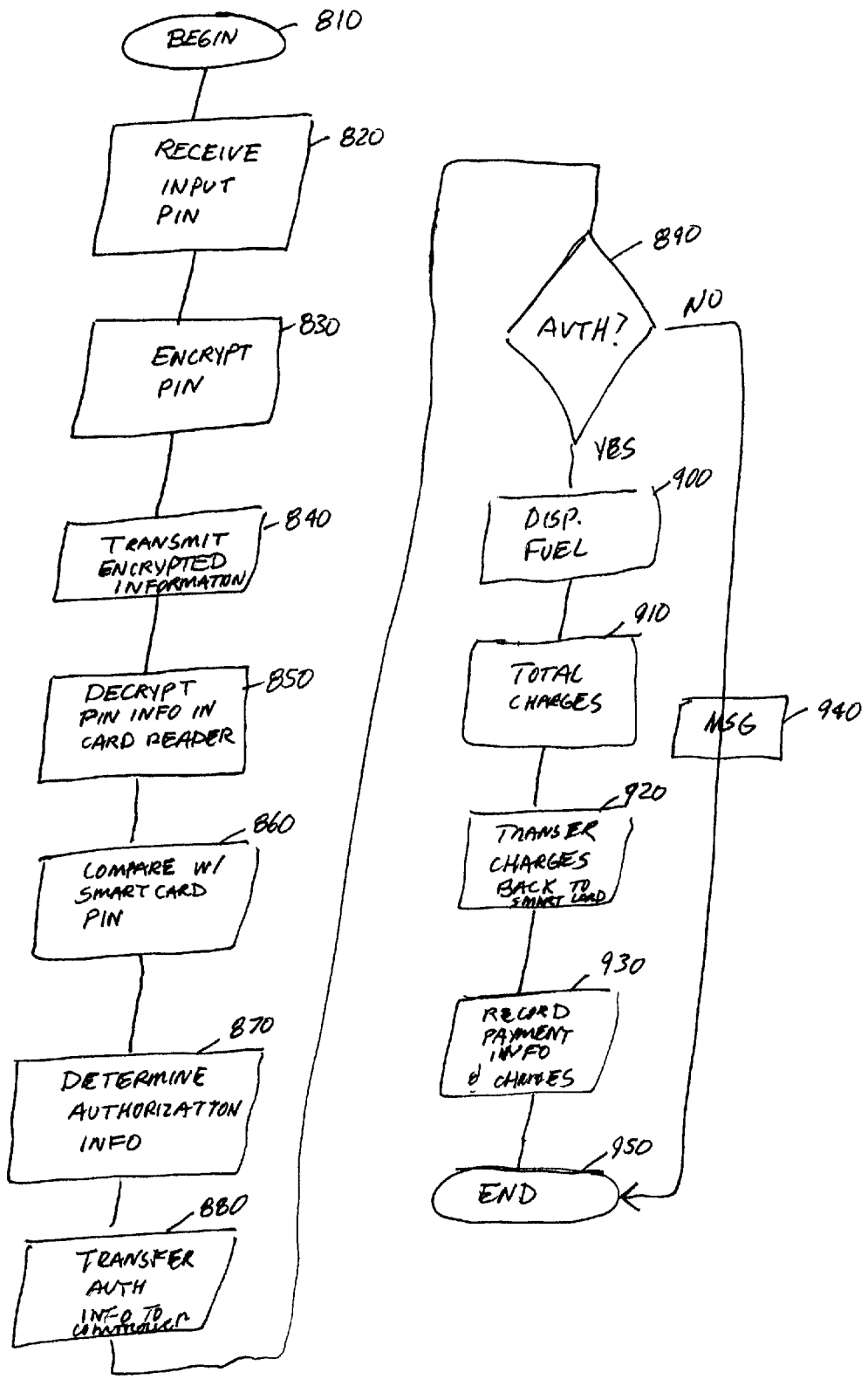
FIG. 8 is a simplified logic flow diagram illustrating an exemplary logic flow of a fuel dispensing system equipped with the card reader module of the present invention.

FIG. 8 illustrates simplified flow logic outlining operation of the system 200 in accordance with a preferred embodiment of the present invention. Operation begins (block 810) with the system 200 in a state associated with the start of a fueling transaction. In this state, the customer has indicated to the system 200 their desire to conduct a smart card-based fueling transaction. As such, the customer inputs their PIN into SMART PAD 120 (block 820). Subsequent to completion of PIN input operations, SMART PAD 120 encrypts the input PIN (block 830). SMART PAD 120 then transfers the encrypted PIN information (block 840) either directly or indirectly to the card reader module 130.

The card reader module 130 decrypts the encrypted PIN information (block 850) for comparison with PIN information stored in the smart card 202 (block 860). Based on this comparison, the card reader module 130 determines authorization information (block 870), and transfers the authorization information to the control system 110 (block 880). The control system 110 processes the authorization information to determine whether the transaction is authorized (block 890). If the transaction is not authorized (block 890), the system 200 displays a message (block 940) via a customer interface display included in the fuel dispenser 140 indicating that the transaction is disallowed and transaction processing ends (block 950). (Note the system 200 may provide the customer with other payment options if the smart card transaction is disallowed, but this processing is not illustrated.)

If the authorization information indicates that the transaction is authorized (block 890), processing continues with the control system 110 enabling the fuel dispenser 140, thereby allowing the customer to dispense fuel (block 900). Subsequent to completion of the fuel dispensing operations, the control system 110, in cooperation with the fuel dispenser 140, totals the charges associated with the transaction (block 910). Charges are presented to the smart card 202 for debiting from the customer's electronic account (block 920) and the control system 110 records payment information and associated charges (block 930). Once payment is secured, the transaction processing ends (block 950).

The present invention may, of course, be carried out in other specific ways than those herein set forth without departing from the spirit and essential characteristics of the invention. For example, the card reader module 130 of the present invention may be associated with one or with multiple fuel dispensers. Further, the card reader module may receive encrypted information from a variety of sources, such as directly from the SMART PAD 120 or another encryption device, or from the control system 110. Indeed, the card reader module 130 of the present invention may be advantageously included in retail transaction systems apart from the fuel dispensing environments illustrated herein. Thus, the card reader module 130 of the present invention can impart flexibility to these general retail transaction-processing systems by allowing separation between the keypad (or other pin entry device) and the smart card interface.

The present embodiments are, therefore, to be considered in all respects as illustrative and not restrictive, and all changes coming within the meaning and equivalency range of the appended claims are intended to be embraced therein.

What is claimed is:

1. A fuel dispensing system comprising:
   a fuel dispenser for dispensing fuel to a customer in response to an authorization signal;
   a control system for providing said authorization signal to said fuel dispenser based on determined authorization information;
   an indicia entry device for allowing a customer to input a verification indicia, said indicia entry device adapted to encrypt said input verification indicia to form an encrypted verification indicia for transfer to said control system; and
   a card reader separate from said indicia entry device, wherein said card reader is operatively associated with said control system for determining said authorization information based on obtaining a transaction authorization from a customer payment card, said card reader adapted to receive said encrypted verification indicia from said control system and decrypt said encrypted verification indicia to form a decrypted verification indicia, and further adapted to provide said payment card with said decrypted verification indicia to obtain the transaction authorization.

2. The fuel dispensing system of claim 1 wherein said card reader is a smart card reader including a smart card interface and said customer payment card is a smart card.

3. The fuel dispensing system of claim 1 wherein said indicia entry device is an encrypting keypad module.

4. The fuel dispensing system of claim 1 wherein said verification indicia is a PIN and said indicia entry device is a keypad.

5. The fuel dispensing system of claim 1 wherein said fuel dispensing system includes a magnetic card reader for receiving credit/debit card information from a customer credit/debit card, and further wherein said control system provides said authorization signal based on processing said credit/debit card information in combination with said encrypted verification indicia received from said indicia entry device.

6. The fuel dispensing system of claim 1 wherein said card reader is further operatively associated with said indicia entry device and receives said encrypted verification indicia information from said indicia entry device.

7. The fuel dispensing system of claim 1 wherein said indicia entry device and said card reader are each housed within a separate, tamper-resistant enclosure.

8. The fuel dispensing system of claim 1 wherein said indicia entry device and said card reader are both integrated into said fuel dispenser.

9. The fuel dispensing system of claim 8 wherein said control system is a site controller operatively associated with a plurality of like said fuel dispensers and adapted to enable respective ones of said fuel dispensers based on said determined authorization information received from respective ones of said card readers.

10. The fuel dispensing system of claim 1 wherein said control system is a fuel dispenser controller integrated within said fuel dispenser.

11. The fuel dispensing system of claim 1 further comprising a security module associated with said control system, said security module providing encryption key information to said indicia entry device and said card reader.

12. The fuel dispensing system of claim 11 wherein said security module provides said encryption key information to said indicia entry device and said card reader using an encryption key exchange (EKE) algorithm.

13. The fuel dispensing system of claim 11 wherein said encryption key information is used by said indicia entry device to encrypt said input verification indicia and by said card reader to decrypt said encrypted verification indicia.

14. A card reader module for authorizing a transaction comprising:
    a communications interface for receiving encrypted customer verification information and providing a transaction authorization signal;
    a payment card interface separate from said communications interface, wherein said payment card interface communicates with a payment card present in said payment card interface; and
    a processing unit for determining said transaction authorzation signal based on processing said encrypted customer verification information, said processing unit further adapted to decrypt said encrypted customer verification information to form a decrypted customer verification information and communicate said decrypted customer verification information to said payment card via said payment card interface;
    said processing unit further adapted to receive a signal from said payment card via said payment card interface if the transaction is authorized and to provide said transaction authorization signal in response thereto.

15. The card reader module of claim 14 wherein said card reader module is a smart card reader adapted to interface with a smart card.

16. The card reader module of claim 14 wherein said card reader module is physically integrated in a fuel dispenser thereby allowing a control system associated with said fuel dispenser to obtain authorization for a fueling transaction based on communicating with a customer payment card via said card reader module.

17. The card reader module of claim 14 wherein said card reader module is enclosed by a tamper-resistant housing.

18. A method of securely determining a transaction authorization for a retail transaction, comprising the steps of:
    interfacing with a customer payment card using a card reader;
    receiving verification indicia input by a customer into an indicia input device which is separate from said card reader;
    encrypting the verification indicia in said indicia input device;
    transferring the encrypted verification indicia to said card reader;
    decrypting the encrypted verification indicia using said card reader;
    processing the decrypted verification indicia using said card reader in cooperation with said customer payment card;
    determining said transaction authorization based on said processing step; and
    outputting a transaction authorization signal from said card reader based on said determining step.

19. The method of claim 18 wherein said card reader is a smart card reader adapted to interface with a smart card.

20. The method of claim 18 wherein processing the decrypted verification indicia using said card reader in cooperation with said customer payment card comprises transferring the decrypted verification indicia to said customer payment card for verification processing by said customer payment card and receiving authorization information from said payment card based on said verification processing.

21. The method of claim 20 wherein determining said transaction authorization based on said processing step comprises processing said authorization information received from said payment card to determine an authorization status, said authorization status indicating whether the transaction is approved.

22. The method of claim 18 wherein processing the decrypted verification indicia using said card reader in cooperation with said customer payment card comprises receiving stored verification information from said customer payment card and using said stored verification information for verification of the decrypted verification indicia.

23. The method of claim 22 wherein determining said transaction authorization based on said processing step comprises determining an authorization status based on said verification of the decrypted verification indicia, said authorization status indicating whether the transaction is approved.

24. The method of claim 18 wherein said indicia entry device receives encryption key information from an external system, and further wherein said indicia entry device derives an encryption key based on said encryption key information, said encryption key used to encrypt said verification indicia.

25. The method of claim 24 wherein said card reader receives decryption key information from said external system related to said encryption key information received at said indicia entry device, and further wherein said card reader uses said decryption key information to derive a decryption key used to decrypt said encrypted verification indicia.

26. The method of claim 25 wherein said external system supplying encryption key information to said indicia entry device and said decryption information to said card reader eliminates the need for permanently storing matching encryption/decryption key information in said indicia entry device and said card reader module.

27. A fuel dispenser comprising:

a dispenser controller for dispensing fuel to a customer based on receiving a control signal from an associated control system; and an indicia input device for allowing the customer to input a verification indicia, said input indicia device adapted to output said verification indicia in an encrypted format;

a magnetic card reader separate from said indicia input device, wherein said magnetic card reader reads account information from a credit/debit card and transfers said account information to said associated control system; and a smart card reader for communicating with a smart card and further adapted to determine a transaction authorization signal for output to said associated control system based on decrypting said encrypted verification indicia and processing said decrypted verification indicia in cooperation with said smart card;

said associated control system adapted to generate said control signal based on either receiving an authorization response from an outside authorizing network in response to transferring said account information and a processed version of said encrypted verification indicia to said outside authorizing network or on receiving said transaction authorization signal from said smart card reader.

28. The fuel dispenser of claim 27 wherein said indicia input device is a keypad adapted to encrypt a PIN input by a customer.

29. The fuel dispenser of claim 27 wherein said smart card reader comprises:

a communications interface for receiving said encrypted verification indicia;

a processing unit for determining said transaction authorization signal based on decrypting said encrypted verification indicia and processing said decrypted verification indicia in cooperation with said smart card; and a smart card interface for communicating with said smart card.

30. The fuel dispenser of claim 29 wherein said processing unit in said smart card reader receives stored verification information from said smart card through said smart card interface and determines said transaction authorization signal based on verifying said decrypted verification indicia against said stored verification information.

31. The fuel dispenser of claim 29 wherein said processing unit in said smart card reader determines said transaction authorization signal based on authorization information returned from said smart card via said smart card interface, said authorization information determined by said smart card based on receiving said decrypted verification indicia from said processing unit via said smart card interface.

32. The fuel dispenser of claim 27 wherein said smart card reader is housed in a tamper-resistant enclosure suitable for mounting in said fuel dispenser, and wherein said tamper-resistant enclosure is adapted to disable a critical electrical circuit that forms a portion of said smart card reader in response to attempted tampering.

* * * * *